(12) United States Patent
Paolucci

(10) Patent No.: US 6,766,439 B2
(45) Date of Patent: Jul. 20, 2004

(54) APPARATUS AND METHOD FOR DYNAMIC PROGRAM DECOMPRESSION

(75) Inventor: Pier S. Paolucci, Rome (IT)

(73) Assignee: Atmel Corporation, San Jose, CA (US)

(*) Notice: Subject to any disclaimer, the term of this patent is extended or adjusted under 35 U.S.C. 154(b) by 0 days.

(21) Appl. No.: 10/328,525

(22) Filed: Dec. 24, 2002

(65) Prior Publication Data

US 2004/0059892 A1 Mar. 25, 2004

(30) Foreign Application Priority Data

Sep. 20, 2002 (IT) .................................... MI2002A2003

(51) Int. Cl.[7] .............................................. G06F 9/34
(52) U.S. Cl. ...................................... 712/208; 712/24
(58) Field of Search .................................. 712/208, 24

(56) References Cited

U.S. PATENT DOCUMENTS

| | | | | |
|---|---|---|---|---|
| 5,175,543 A | * | 12/1992 | Lantz .......................... 341/51 |
| 5,729,228 A | * | 3/1998 | Franaszek et al. .......... 341/106 |
| 5,768,445 A | * | 6/1998 | Troeller et al. ............. 382/305 |
| 5,784,585 A | * | 7/1998 | Denman ...................... 712/209 |
| 5,867,681 A | * | 2/1999 | Worrell et al. .............. 712/208 |
| 6,401,190 B1 | * | 6/2002 | Nishioka et al. ............... 712/24 |
| 6,564,314 B1 | * | 5/2003 | May et al. ................... 712/210 |

* cited by examiner

Primary Examiner—Eric Coleman
(74) Attorney, Agent, or Firm—Thomas Schneck; Nissa M. Strottman

(57) ABSTRACT

A method and system for decompressing a program word that is subsequently delivered to a processor for execution. Program word fields are compressed based on regularities between operations and operands. The resulting microcode, which describes the trajectory of the program, is stored in program memory and fed to dynamic program decompression devices, or dyprodes, which are assembled using registers and multiplexers and are driven by a clock, reset signals, and the microcode. At each cycle, the dyprodes produce an uncompressed field of the program word. The reassembled program word is then passed on to a processor for execution. The use of a dyprode system reduces program memory required to store code and reduces the size of the bus connecting a microprocessor to off-chip program memory. In addition, power consumption in CMOS processor designs is also reduced because there is a lower toggle rate inside the processor's register file and devices when, during cycles when a processor device is unused, the dyprode freezes controls and read addresses to values assigned during the last useful operation.

62 Claims, 6 Drawing Sheets

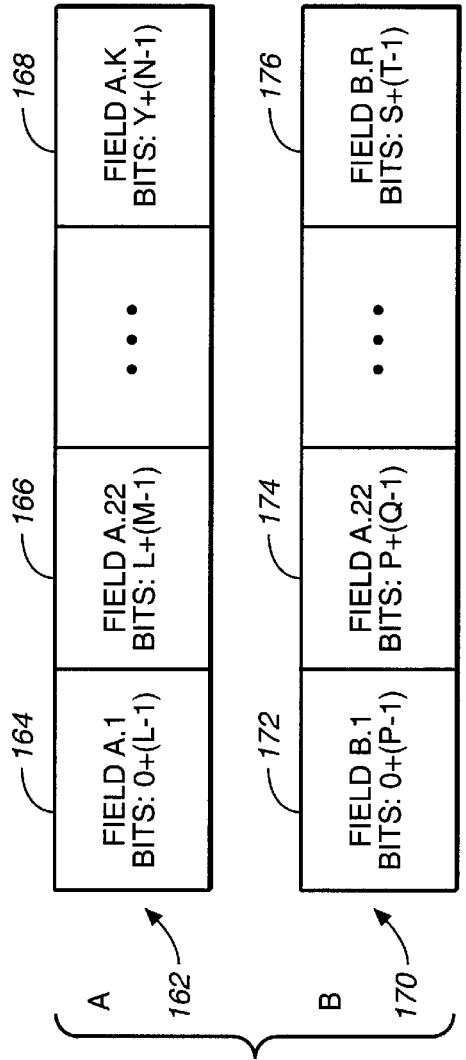
FIG._1A *(PRIOR ART)*
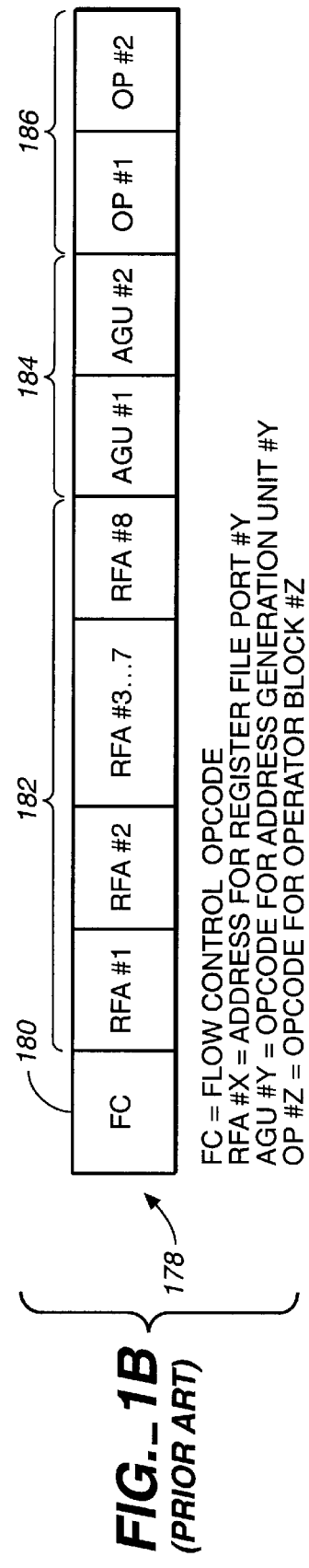
FIG._1B *(PRIOR ART)*

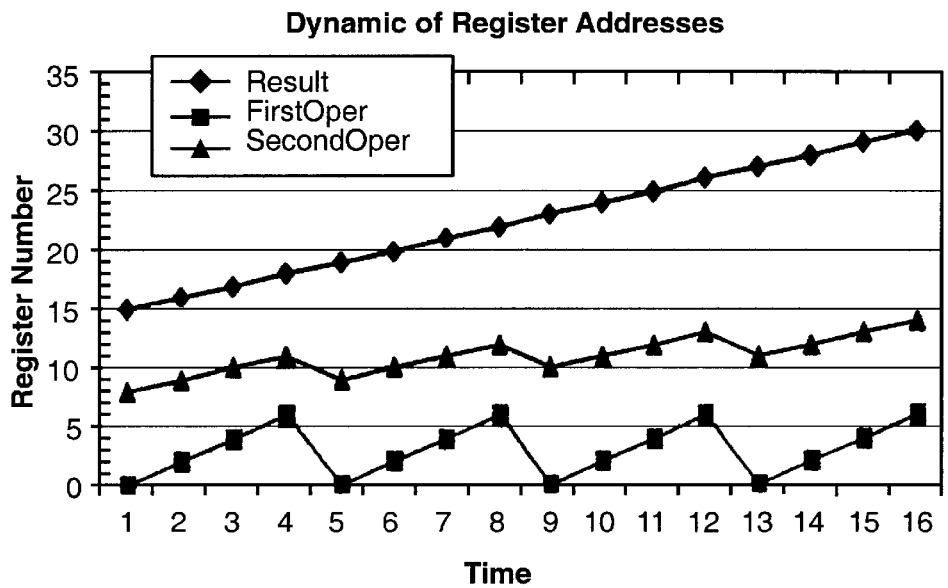
FIG._2
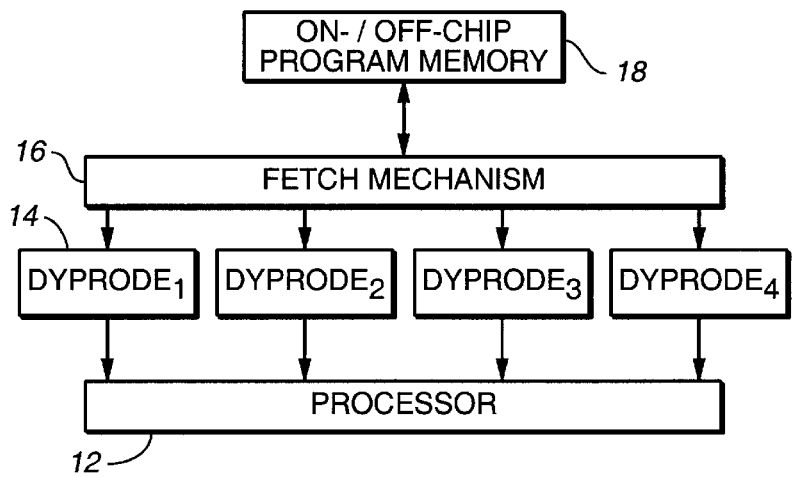
FIG._3
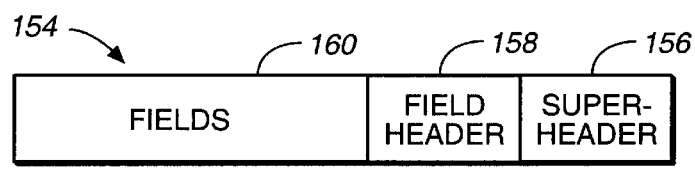
FIG._4

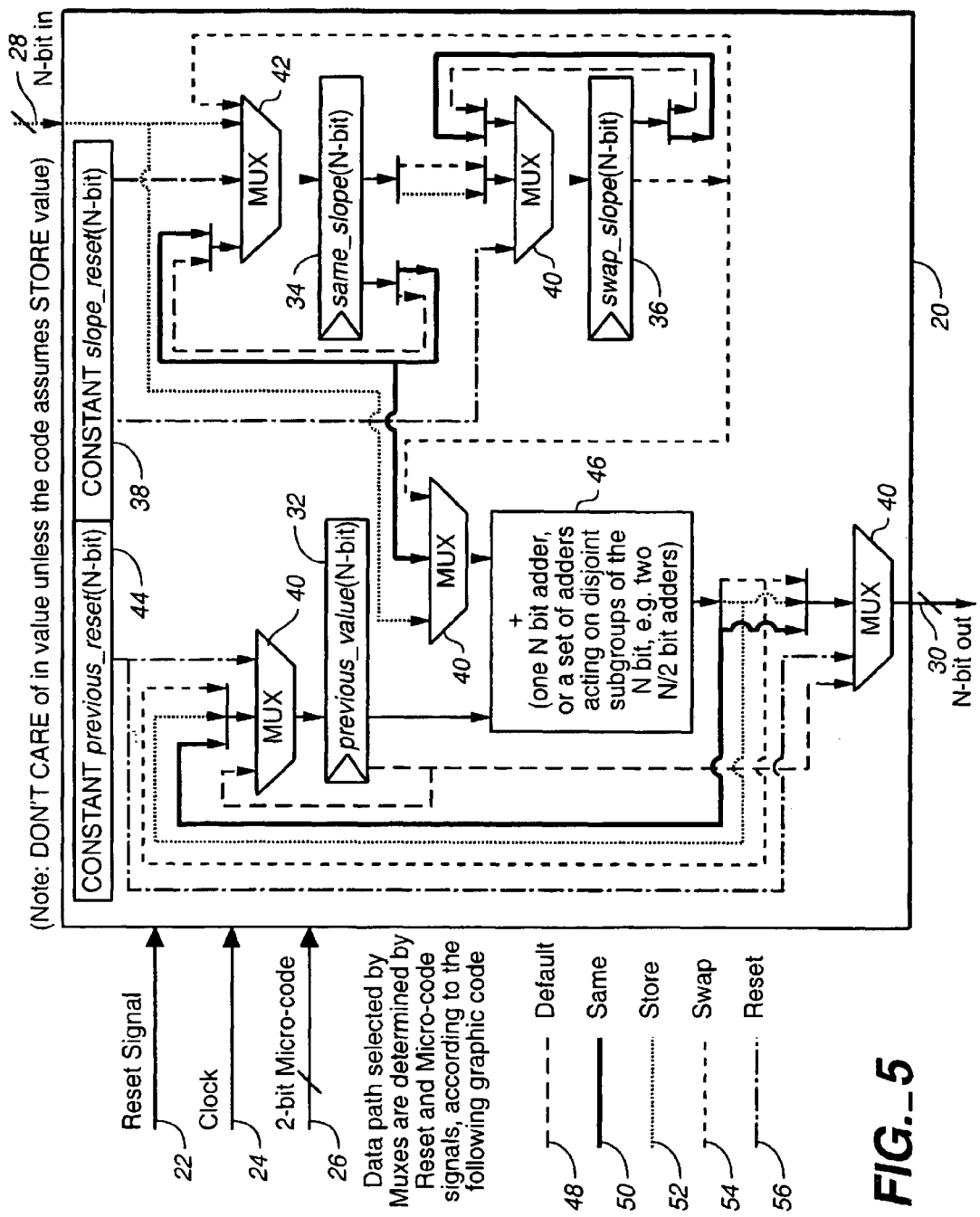
FIG._5

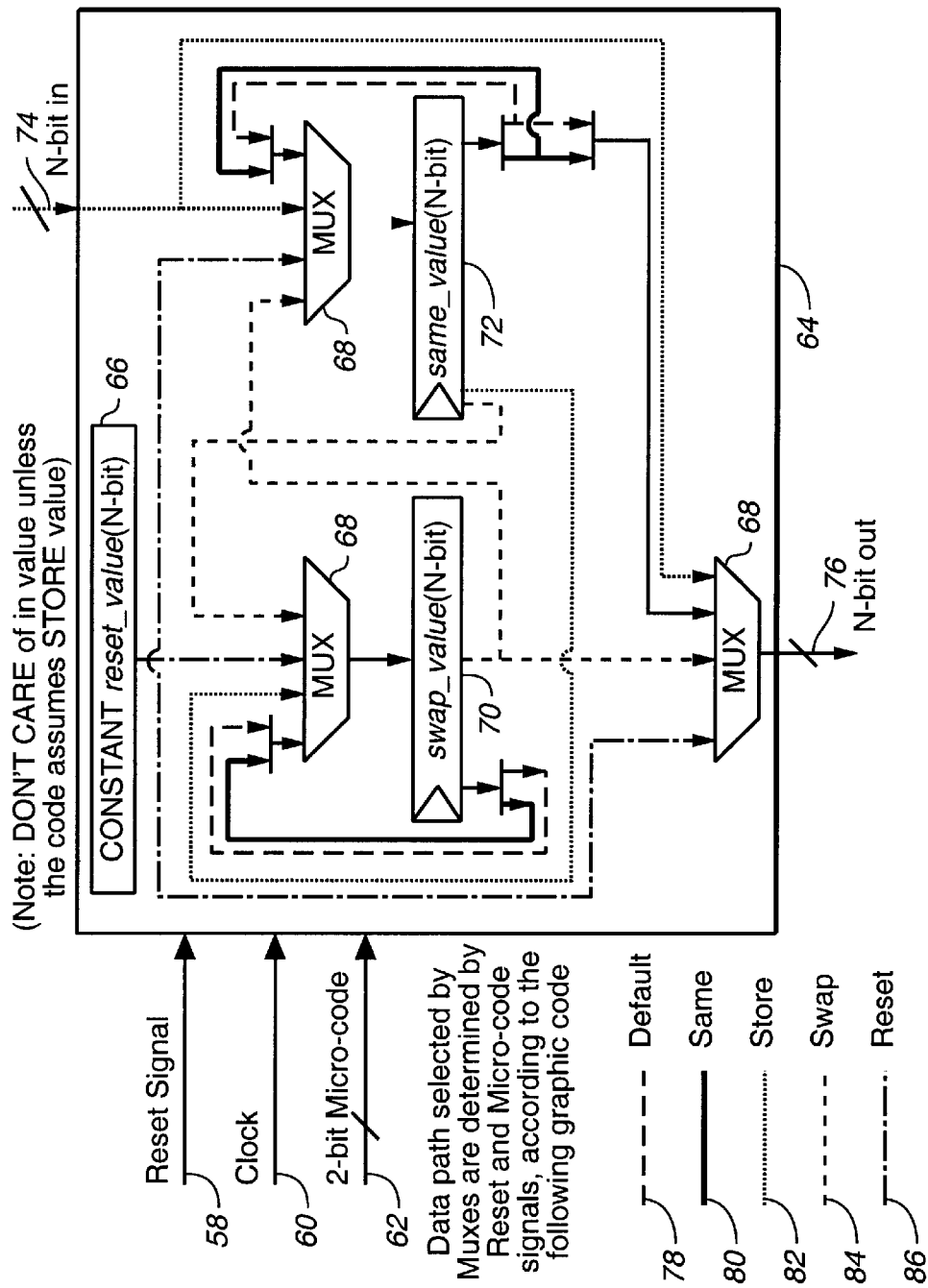
FIG._6

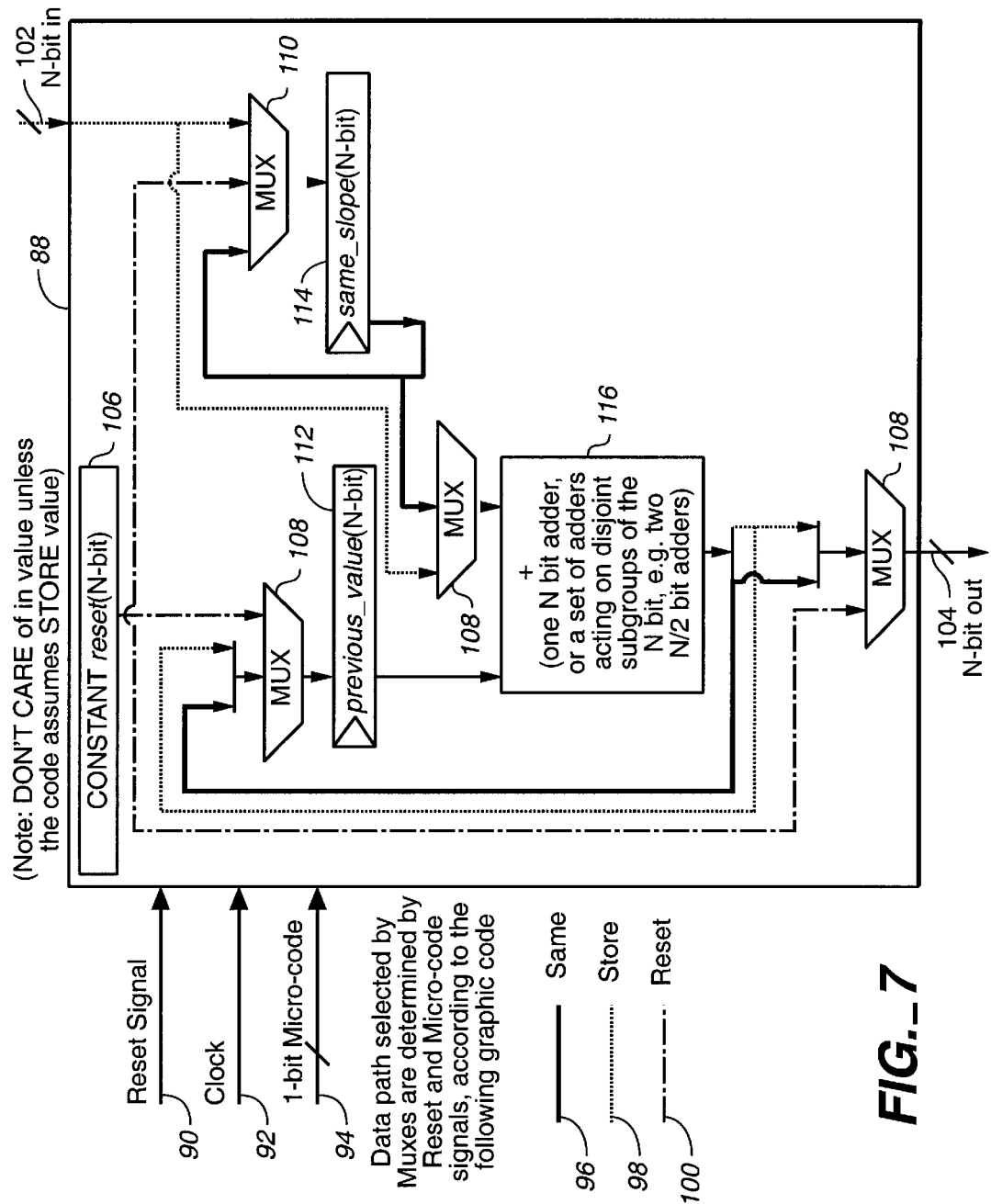
FIG._7

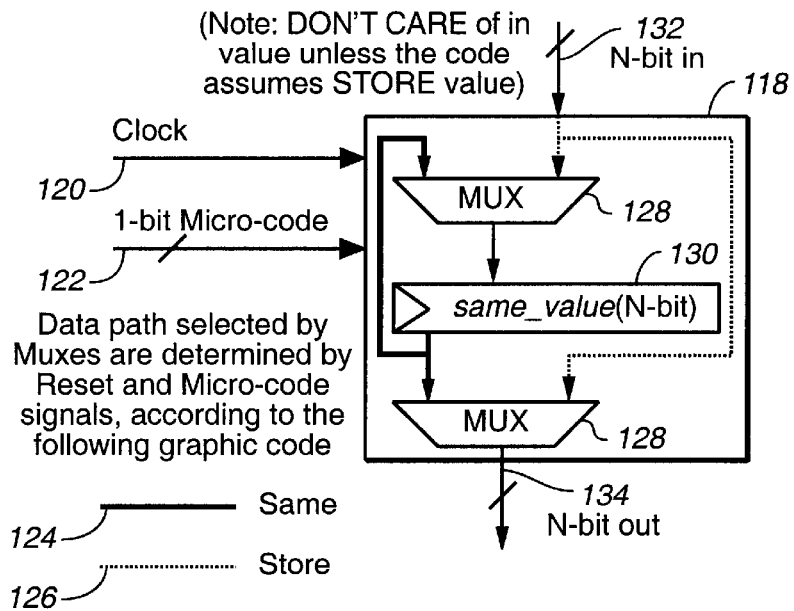
FIG._8
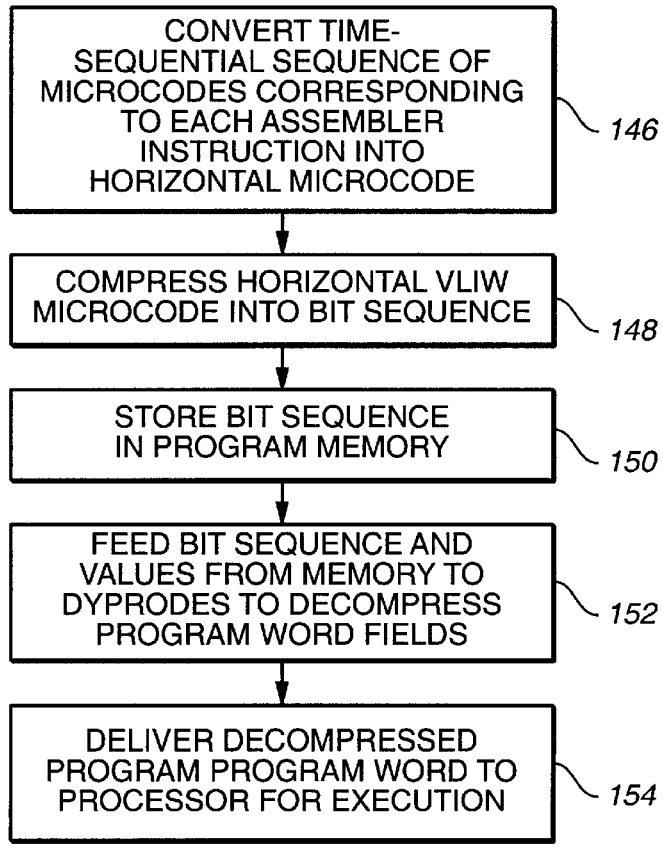
FIG._9

APPARATUS AND METHOD FOR DYNAMIC PROGRAM DECOMPRESSION

FIELD OF THE INVENTION

This invention is concerned with compression and decompression of program words, particularly program words for VLIW processors.

BACKGROUND OF THE INVENTION

Due to the need for high-performance processing in certain tasks, such as game engines, graphic rendering systems, complex system simulators, multimedia, and real-time digital signal processing, there is a demand for high-speed processors, which can quickly process large amounts of data. Superscalar processors, which can execute more than one instruction at a time, have become necessary components of high-performance devices. Older microprocessor designs, such as complex instruction set computing (CISC) and reduced instruction set computing (RISC), can be used to execute several instructions at once, although this requires complex control circuitry which can be quite expensive.

Very long instruction word (VLIW) processors are able to process multiple individual instructions for multiple individual functional units every clock cycle. VLIW processors have a simpler design than CISC and RISC chips. VLIW chips can be less expensive, use less power, and achieve higher performance than either CISC or RISC chips. The drawback, however, is that while the design of the VLIW chip is simpler than that of its predecessors, creating and compiling code that will enable the VLIW chip to operate efficiently can be difficult. Since the instruction words for VLIW processors code for several instructions, the instruction words for VLIW processors are consequently very long, up to hundreds of bits in length, and require a large amount of program memory for storage as well as a large bus that can transfer the instruction word from off-chip memory to the processor. This is problematic, particularly in smaller, hand-held devices where the physical dimensions of the device limit the size of the processor, bus, and memory that may be employed in the device.

U.S. Pat. No. 5,819,058, "Instruction Compression and Decompression System and Method for a Processor," to Miller et al. describes a system and method for reducing the amount of memory required to store very long instruction words in a VLIW processor. The VLIWs are compressed in a number of ways, including shortening default instructions, compressing bits that are not required to execute instructions, and assigning short codes to longer instructions, which are expanded at execution time.

U.S. Pat. No. 5,878,267, "Compressed Instruction Format for Use in a VLIW Processor and Processor for Processing Such Instructions," to Hampapuram et al. describes software which compresses VLIW instructions which are stored in memory and then decompressed "on the fly" after being read out from the cache. Each instruction consists of several operations. Each operation is compressed according to a compression scheme for that particular operation; the compression scheme assigns a compressed operation length to each operation. Compression is dependent on at least one feature of the operation. Branch targets are uncompressed.

It is an object of the invention to provide an apparatus and method for minimizing program memory size for VLIW architectures.

It is another object of the invention to reduce the program bus size of a VLIW architecture.

It is a further object of the invention to reduce power consumption in CMOS processor designs.

SUMMARY OF THE INVENTION

These objects are met by an apparatus and method for dynamic program decompression. A program is converted from a time-sequential sequence of microcodes corresponding to each assembler instruction into horizontal VLIW microcode. (Although for purposes of explanation the VLIW architecture is primarily discussed, this is not meant to imply that the application of the disclosed apparatus and system is limited to VLIW architectures—the apparatus and method may also decompress a generic flow of information.) The horizontal VLIW microcode is then compressed into a bit sequence that is stored in program memory.

The compression algorithm producing the bit sequence takes advantage of regularities occurring in the sequence of values assigned over time to each field of the horizontal VLIW microcode. A trajectory in the space of operations and operands to be executed at each cycle can be shown. If this trajectory is considered over time, the information needed to specify a single instruction can be reduced by specifying the relationship among a set of operands (and/or opcodes) to be issued to the processor at a given cycle and those issued at previous cycles, for instance by describing the trajectory in terms of starting points and deltas, rather than expressing the instruction itself.

The resulting bit sequence is then fed to dynamic program decompression devices, or dyprodes. Each of these devices is fed a continuous stream of 1- or 2-bit microcodes, i.e., the bit sequence describing main features of the trajectory of the program. The dyprodes, which are assembled using registers and multiplexers and are driven by a clock, reset signals, and the microcode, use the microcode from either internal or external memory and, where appropriate, input from either internal or external memory to produce an uncompressed field of the program word. By using a series of dyprodes, the entire uncompressed program word can be reconstructed and passed on to the processor for execution.

The use of a dyprode system may reduce the program memory size considerably, as well as reducing the size of the bus connected to an off-chip program memory. Power consumption in CMOS processor designs is also reduced because there is a lower toggle rate inside the processor's register file and processor devices when, during cycles where a processor device is not used, the dyprode freezes controls and read addresses to values assigned during the last useful operation.

Dyprodes may be modified to decompress different parts of a program word. Some dyprodes are best suited to decompress opcodes or immediate values while other types of dyprodes decompress register file addresses.

BRIEF DESCRIPTION OF THE DRAWINGS

FIG. 1a is a block diagram of sample VLIW program words in the prior art.

FIG. 1b is a block diagram of a sample VLIW program word in the prior art.

FIG. 2 is a graph showing a trajectory in the space of operations and operands of a program to be executed at each cycle.

FIG. 3 is a block diagram showing a dyprode system on a microprocessor chip.

FIG. 4 is a block diagram of a compressed VLIW program word used in one embodiment of the invention.

FIG. 5 is a block diagram of a slope dyprode driven by 2-bit microcode in accordance with the invention.

FIG. 6 is a block diagram of a value dyprode driven by 2-bit microcode in accordance with the invention.

FIG. 7 is a block diagram of a slope dyprode driven by 1-bit microcode in accordance with the invention.

FIG. 8 is a block diagram of a value dyprode driven by 1-bit microcode in accordance with the invention.

FIG. 9 is a flowchart describing the compression and decompression of a program word in accordance with the invention.

DETAILED DESCRIPTION

The following discussion will focus on VLIW program words, although the application of method and system discussed here are not limited to VLIW architectures and may be used to compress and decompress a generic flow of information.

A VLIW program word is created when a compacting compiler converts a time-sequential sequence of microcodes corresponding to each assembler instruction into horizontal VLIW microcode. In FIG. 1a, sample VLIW program words 162, 170 from the prior art consist of a number of fields 164, 166, 168, 172, 174, 176, conveying the multiplicity of opcodes and operands required to exploit Instruction Level Parallellism. The number and size of fields 164, 166, 168, 172, 174, 176 may vary over execution cycles, but a single VLIW processor adopts a limited number of decoding schemes, due to the large of the word to be decoded. For instance, words A 162 and B 170 may be decoded using different schemes.

With reference to FIG. 1b, in a sample decoding scheme program word 178 consists of a number of independent fields which may be simultaneously issued to the processor. For instance, the fields may include flow control 180, addresses for an eight port register file 182, opcodes for two address generation units 184, and opcodes for two operator blocks 186.

In a preferred embodiment of the invention, the horizontal VLIW microcode is then compressed into a bit sequence that is stored in program memory. The compression algorithm producing the bit sequence takes advantage of regularities occurring in the sequence of values assigned over time to each field of the horizontal VLIW microcode. A trajectory in the space of operations and operands to be executed at each cycle can be shown. If this trajectory is considered over time, the information needed to specify a single instruction can be reduced by specifying the relationship between the operands (and/or opcodes) to be issued to the processor at a given cycle and those executed at previous cycles, for instance by describing the trajectory in terms of starting points and deltas, rather than expressing the instruction itself.

An example of how the code may be compressed follows. Given the following code:

```
#define SIZE 4
register int FirstOper[2*SIZE];
register int SecondOper[2*SIZE-1];
...
for (i=0;i<SIZE;i++)
{
    for (j=0;j<SIZE;j++)
```

-continued

```
    {
        Result [i] [j] = FirstOper[2*j] * SecondOper [i+j];
    }
}
...
```

Suppose the code will be executed on a processor having a register file large enough to store the three vectors Result, FirstOper, and SecondOper. A compiler could map FirstOper on register R0–R7, SecondOper on R8–R14, and Result on R15–R30. The compiler could generate an assembler as follows (imul is an assembler instruction which multiplies registers, producing a result register):

R15=imul(R0,R8);
R16=imul(R2,R9);
R17=imul(R4,R10);
R18=imul(R6,R11);
R19=imul(R0,R9);
R20=imul(R2,R10)
R21=imul(R4,R11);
R22=imul(R6,R12);
R23=imul(R0,R10);
R24=imul(R2,R11);
R25=imul(R4,R12);
R26=imul(R6,R13);
R27=imul(R0,R11);
R28=imul(R2,R12);
R29=imul(R4,R13);
R30=imul(R6,R14)

As shown in FIG. 2, the dynamic of register addresses for Result, FirstOper, and SecondOper may be plotted (here, time is measured in program execution cycles while the y-axis shows register addresses). By examining the trajectory of the operand addresses, it is possible to determine the relationship between the operand addresses. This is the key to the compression approach employed here. Without compression, 24 bits of program memory would be required for an instruction to specify each register's address. However, examination of the dynamic of register addresses as shown in FIG. 2 indicates that program memory may be conserved by storing values related to the trajectory of the addresses rather than storing the individual addresses. Program memory may also be conserved by storing values related to the trajectory of operands where the probability of a set of symbols tends to peak on a limited set of values, as discussed below.

Consider the FirstOper line. Suppose the following values are stored:

1) Starting point (here, 0);
2) The upward slope linking the first four points (here, the slope is 2);
3) The downward slope linking points 4 and 5 and points 8 and 9 (here, the slope is −4);

If the slope to be used at each cycle were specified rather than the actual register address, the number of required program memory bits would decrease. It should also be noted that the slopes of FirstOper and SecondOper change at the same cycles; this simultaneous change in the trajectories of operands associated with the same operator is quite usual. This pattern allows even more program memory to be conserved, since a single packet to be compressed can express: 1) the 16 bits specifying the addresses of FirstOper and SecondOper; 2) the 24 bits associated with all three operands, FirstOper, SecondOper, and Result; or 3) the operating microcode plus the 24 bits associated with the three operands.

The dynamic decompression devices, or dyprodes, use this relationship between the operators and operands to produce fields of program words from the bit sequence discussed above; the structure of the dyprode does not require that the full 24 bits associated with all operands be stored for every cycle to produce the uncompressed program word. Instead, as shown below, 24 bits may be regenerated at each cycle from information stored in the dyprode.

In FIG. 3, dyprodes 14 are on-chip devices which form part of a decompression system. The dyprodes 14 receive instructions and values from on- or off-chip program memory 18 via a mechanism 16 which fetches compressed words from memory 18 and delivers the word's fields to the appropriate dyprode 14 for decompression. This mechanism 16 in one embodiment may include a state machine for enabling decompression and a shifting unit which fetches stored words from memory, shifts them an appropriate number of bits, and distributes the word fields to the appropriate dyprode for decompression. Although 4 dyprodes 14 are displayed here, any number of dyprodes 14 may be used in other embodiments.

With respect to FIG. 4, a compressed VLIW word 154 which is used in one embodiment of the invention has an 8-bit super header 156, a 16-bit field header 158, and fields 160 having seven 16-bit fields, and one 8-bit field. The super header 156 bits communicate the structure of the compressed word to the decompressing mechanism or perform a realignment when a jump instruction or procedure call occurs. The field header 158 contains 8 couples of bits, each of which is the operative code (store, default, same, and swap) for the corresponding dyprode device (assuming there are 8 dyprodes in the decompression system). The remaining fields 160 are the 16-bit and 8-bit values to be read by dyprodes when their operative codes assume the "store" value. The number of fields 160 present in the compressed word 154 is determined, cycle by cycle, by the number of operative codes which assume the store value. In other embodiments, the field header 158 may not be present at every cycle (for instance, if all fields of the compressed word are present, in which case the super header will be used as operative code for the dyprodes (see Table 1, below). For example, the "All Store" code tells the decompressor that all the fields of the compressed word are present and the field header 158 is not necessary. However, if the operative code is "Mixed," the field header 158 is necessary). Additionally, in other embodiments the individual fields may not all be present. In this embodiment, the decompressed VLIW word is 120 bits in length.

Table 1 summarizes a potential arrangement of the super header 156 bits.

TABLE 1

| Bit | Function |
| --- | --- |
| 0 | Fetch signal |
| 1 | Software reset signal |
| 3 downto 2 | Operative Code (All Store ("11"), All Default ("00"), Mixed ("10"), Shift All ("01") ) |
| 7 downto 4 | Current Word Length (multiple of 8 bits) |

Table 2 summarizes the meaning of operative code for the dyprode devices which may be contained in the field header 158. A complete description of these operative codes is offered below in Table 4.

TABLE 2

| Operative Code Binary Value | Meaning of Operative Code |
| --- | --- |
| 11 | Store |
| 00 | Default |
| 01 | Same |
| 10 | Swap |

A slope dyprode 20 ("Dyprode 1") is shown in FIG. 5. Dyprode1 20 is driven by a reset signal 22, a clock 24, and a continuous stream of 2-bit microcode. This slope dyprode 20 features 3 N-bit registers: previous_value 32, same_slope 34, and swap_slope 36. There are 2 N-bit constants: previous_reset 44 and slope_reset 38. Dyprode1 20 also contains four multiplexers ("muxes") with N-bit inputs 40 and one multiplexer with 4 N-bit inputs 42. There is also one N-bit ader 46 (module $2^N$, carry-out ignored), or a set of disjoint adders (e.g., two N/2-bit adders, or three N/3-bit adders). Dyprode1 20 has an N bit in 29 (N is fixed by specific implementation) and, each cycle, generates N bit out. In this embodiment, N bit in 28 is updated from the environment, or memory (either internal or external), only when such an update is required by the 2-bit microcode "store" command. (Depending on the embodiment, the N-bit input to the dyprode may include a slope value, a store opcode, or a numerical value.)

As mentioned above, the 2-bit microcode results from the compression of the horizontal VLIW microcode into a bit sequence. For this type of dyprode, the microcrode mnemonic and binary value are shown in Table 3, below.

TABLE 3

| Microcode Mnemonic | Microcode Binary Value |
| --- | --- |
| default | 00 |
| same | 01 |
| swap | 10 |
| store | 11 |

If this slope dyprode 20 receives a reset signal 22, the value of CONSTANTprevious_reset is loaded into the previous_value register 32 and the value of the CONSTANT reset_slope 38 is loaded into the same_slope and swap_slope registers 34, 36. In the absence of a reset signal 22, Dyprode1 20 is controlled by microcode 26. The data paths for the reset 22 and microcode 26 signals (default 48, same 50, store 52, swap 54, and reset 56) are also illustrated in FIG. 5. The microcode 26 behaviors are summarized below in Table 4:

TABLE 4a

| Microcode | Detailed behavior |
| --- | --- |
| store 52 | New slope value must be immediately used and stored: N-bit in added to previous_value 32, generates N-bit out. same_slope 34 value pushed into swap_slope register 36. N-bit in is assigned to same_slope 34. After output generation, previous_value 32 assumes the out value. |

TABLE 4a-continued

| Microcode | Detailed behavior |
| --- | --- |
| same 50 | N-bit out is generated using same_slope 34 and previous_value 32. After output generation, previous_value 32 assumes the out value. |
| swap 54 | The N-bit out is generated using same_slope 36 and previous_value 32. After output generation, previous-value 32 assumes the out value. A "swap" of the content of the content of the swap_slope 36 is executed. |
| default 48 | N-bit out is determined by previous_value 32. |

As can be seen in Table 4a above, when the microcode is "default" 48, previous_value 32 determines N-bit out. Use of the "default" 48 microcode allows a reduction of the toggle rate in a CMOS design processor when a processor device, such as a multiplier or adder, is not used during a clock cycle. For example, in a system with a multiplier and an adder fed by a 4-port read, 2-port write register file, if an adder is not used at one cycle, the following steps are taken if the dyprodes generating file addresses and arithmetic opcodes for the adder execute a "default" 48 microcode: 1) freezing the processor register files to the last useful address (this can be done by the slope dyprode associated with the output ports of the processor register file connected to the adder); 2) freezing the controls on the adder to the last executed microcode (this can be done by the value dyprode associated with the adder); and 3) generating a write disable on the processor register file writing ports where the results of the addition would otherwise be written. These steps for freezing controls and read addresses to values assigned during the last useful operation reduce the toggle rate inside the processor register file and within the device itself.

An interesting variant of slope dyprode 20 could output the value of previous_reset 44 when executing a default operating code. The advantage is a simpler (less invasive) embodiment of the decompression system in the design of a complete processor; the disadvantage is that a lower toggle rate reduction is obtained.

Another interesting variant of slope dyprode 20 is obtained adding a software_reset xxx signal in input. This signal can reduce the latency at execution time when executing a branch, where all the registers inside a dyprode must assume the reset value. In fact, it is generally impossible to know at compile time if a conditional branch will be executed. Therefore, a reset should be issued on execution of cycles corresponding to branch targets (LABELS). This would introduce a latency cycle needed to execute a conventional reset of dyprode internal registers. With the additional software_reset signal, we can avoid the insertion of that latency code. Table 4b shows these modifications.

TABLE 4b

| Microcode | Detailed behavior |
| --- | --- |
| store 52 AND software_reset xxx | New slope value must be immediately used and stored: N-bit in added to zero (instead of the previous_value 32) generates N-bit out. Zero value pushed into swap_slope register 36. N-bit in is assigned to same_slope 34. After output generation, previous_value 32 assumes the N-bit out value. |
| default 48 AND software_reset xxx | N-bit out assumes the previous_reset value. All the internal registers assume their reset value. |

Table 5, below, shows how program memory is conserved using the invention's compression/decompression approach. In the following instance, results of compression of the assembler code are shown where the Result field is compressed separately from the FirstOper and Secondoper field. Each of these compressed fields would be fed to a separate slope dyprode, in this case an 8-bit slope dyprode to decompress the result field and a 16-bit dyprode for compressing the FirstOper and SecondOper field. In the 16-bit dyprode, the adder is split into two 8-bit disjoint adders. "Other" indicates any assembler operation not using the multiplier, associated with the default microcode. The 0xFAFE value is necessary to generate modulo 8-bit subtractions of −6 and −2, corresponding to the negative slopes necessary to stepbeyond, e.g. from R6 to R0 and R11 to R9.

TABLE 5

| | | Result Field, after compression, driving an 8-bit slope dyprode | | First- and SecondOper Field, after compression, driving a 16-bit slope dyprode | |
| --- | --- | --- | --- | --- | --- |
| Bits after Compression | Assembler | 2-bit Micro-code | 8-bit in | 2-bit Micro-code | 16-bit in |
| | ... | RESET | dontcare | RESET | dontcare |
| 2 + 8 + 2 + 16 | R15 = imul(R0, R8) | STORE | 0 × 0F | STORE | 0 × 0008 |
| 2 + 2 | Other | DEFAULT | dontcare | DEFAULT | dontcare |
| 2 + 8 + 2 + 16 | R16 = imul(R2, R9) | STORE | 0 × 01 | STORE | 0 × 0201 |
| 2 + 2 | R17 = imul(R4, R10) | SAME | dontcare | SAME | dontcare |
| 2 + 2 | Other | DEFAULT | dontcare | DEFAULT | dontcare |
| 2 + 2 | R18 = imul(R6, R11) | SAME | dontcare | SAME | dontcare |
| 2 + 2 + 16 | R19 = imul(R0, R9) | SAME | dontcare | STORE | 0 × FAFE |

TABLE 5-continued

| | | Result Field, after compression, driving an 8-bit slope dyprode | | First- and SecondOper Field, after compression, driving a 16-bit slope dyprode | |
|---|---|---|---|---|---|
| Bits after Compression | Assembler | 2-bit Micro-code | 8-bit in | 2-bit Micro-code | 16-bit in |
| 2 + 2 | Other | DEFAULT | dontcare | DEFAULT | dontcare |
| 2 + 2 | R20 = imul(R2, R10) | SAME | dontcare | SWAP | dontcare |
| 2 + 2 | R21 = imul(R4, R11) | SAME | dontcare | SAME | dontcare |
| 2 + 2 | R22 = imul(R6, R12) | SAME | dontcare | SAME | dontcare |
| 2 + 2 | R23 = imul(R0, R10) | SAME | dontcare | SWAP | dontcare |
| 2 + 2 | Other | DEFAULT | dontcare | DEFAULT | dontcare |
| 2 + 2 | R24 = imul(R2, R11) | SAME | dontcare | SWAP | dontcare |
| 2 + 2 | R25 = imul(R4, R12) | SAME | dontcare | SAME | dontcare |
| 2 + 2 | R26 = imul(R6, R13) | SAME | dontcare | SAME | dontcare |
| 2 + 2 | R27 = imul(R0, R11) | SAME | dontcare | SWAP | dontcare |
| 2 + 2 | R28 = imul(R2, R12) | SAME | dontcare | SWAP | dontcare |
| 2 + 2 | R29 = imul(R4, R13) | SAME | dontcare | SAME | dontcare |
| 2 + 2 | R30 = imul(R6, R14) | SAME | dontcare | SAME | dontcare |
| 2 + 2 | Other | DEFAULT | dontcare | DEFAULT | dontcare |

If compression were not employed, a total of 504 bits would be required to store the register addresses for the instructions for the 21 cycles listed here (21 cycles*24 bits/cycle=504 bits). By compressing the FirstOper and SecondOper field and the Result Field, only 148 bits are required when a 16-bit dyprode is combined with an 8-bit dyprode, for a compression rate of 3.4 (504 bits/148 bits).

Greater compression rates may be achieved if the all three register fields were decompressed by a single 24-bit dyprode, containing 3 8-bit adders. Table 6, below, shows the results using this approach.

TABLE 6

| | | Result, FirstOper and SecondOper Field | |
|---|---|---|---|
| Bits after Compression | Assembler | 2-bit Micro-Code | 24-bit in |
| . . . | | RESET | Dontcare |
| 2 + 24 | R15 = imul(R0, R8) | STORE | 0X0F0008 |
| 2 | Other | DEFAULT | dontcare |
| 2 + 24 | R16 = imul(R2, R9) | STORE | 0x010201 |
| 2 | R17 = imul(R4, R10) | SAME | dontcare |
| 2 | Other; | DEFAULT | dontcare |
| 2 | R18 = imul(R6, R11) | SAME | dontcare |
| 2 + 24 | R19 = imul(R0, R9) | STORE | 0X01FAFE |
| 2 | Other | DEFAULT | dontcare |
| 2 | R20 = imul(R2, R10) | SWAP | dontcare |
| 2 | R21 = imul(R4, R11) | SAME | dontcare |
| 2 | R22 = imul(R6, R12) | SAME | dontcare |
| 2 | R23 = imul(R0, R10) | SWAP | dontcare |
| 2 | Other | DEFAULT | dontcare |
| 2 | R24 = imul(R2, R11) | SWAP | dontcare |
| 2 | R25 = imul(R4, R12) | SAME | dontcare |
| 2 | R26 = imul(R6, R13) | SAME | dontcare |
| 2 | R27 = imul(R0, R11) | SWAP | dontcare |
| 2 | R28 = imul(R2, R12) | SWAP | dontcare |
| 2 | R29 = imul(R4, R13) | SAME | dontcare |
| 2 | R30 = imul(R6, R14) | SAME | dontcare |
| 2 | Other | DEFAULT | dontcare |

Only 114 bits are required to store the register addresses when a 24-bit slope dyprode is used. The compression rate here is 4.4 (504 bits/114 bits).

Another type of dyprode, the value dyprode, may be used when the probability of a set of symbols tends to peak, over time, on subsets, each one composed of a limited number of values. For example, if a program section displays locally a frequent usage of a restricted set of arithmetic microcodes, an appropriately-designed value dyprode can reduce program memory usage and consumption of power in a CMOS design because it is able to freeze controls of unused devices to the last useful microcode. During default cycles, the value dyprode produces a write disable signal, reducing the toggle rate within the processor as described above.

With reference to FIG. 6, the value dyprode 64 ("Dyprode2") is driven by a clock 60, a reset signal 58, and a 2-bit microcode 62. Dyprode2 64 features 2 N-bit registers, swap_value 70 and same_value 72, and one N-bit CONSTANT reset_value 66. This value dyprode 64 also features 3 multiplexers 68 with 4 N-bit inputs. For each cycle, the Dyprode2 64 produces N bits of output 76.

The microcode commands 62 controlling Dyprode2 64 are summarized in Table 7, below.

TABLE 7

| Microcode Mnemonic | Microcode Binary Value |
|---|---|
| default | 00 |
| same | 01 |
| swap | 10 |
| store | 11 |

As with Dyprode1 discussed in FIG. 5 above, the N-bit in value 74 for Dyprode2 64 shown in FIG. 6 doesn't matter unless the microcode command is "store." Data paths for the microcode commands (default 78, same 80, store 82, and swap 84) and reset signal 86 are also shown in FIG. 6.

As with Dyprode1, an interesting variant for Dyprode2 64 could output the value of reset_value 66 when executing a default operating code. Again, the advantage is a simpler (less invasive) embodiment of the decompression system in the design of a complete processor; the disadvantage is that a lower toggle rate reduction is obtained. As with Dyprode1, another interesting variant of value dyprode 64 is obtained adding a software_reset xxx signal in input for reducing latency on branch execution.

In addition to the slope and value dyprodes driven by 2-bit microcode described above in FIGS. 5 and 6, dyprodes may be controlled by a single bit code. With reference to FIG. 7, a slope dyprode 88 ("Dyprode3") is driven by a reset signal 90, clock, 92, and 1-bit microcode 94. Dyprode3 88 features three 2 N-bit input multiplexers, one 3 N-bit input multiplexer, and one N bit adder 116 (in other embodiments, the adder 116 may be a set of adders acting on disjoint subgroups of the N bit, e.g. two N/2 bit adders). There is a CONSTANT reset 106 and 2 N-bit registers, previous_value 112 and same_slope 114. Dyprode3 88 produces N bits of output 104 at each cycle.

The microcode commands 94 controlling Dyprode3 are summarized in Table 8, below.

TABLE 8

| Microcode Mnemonic | Microcode Binary Value |
|---|---|
| Store | 0 |
| Same | 1 |

Unless the microcode command is "store," the N-bit in value 102 for Dyprode3, shown in FIG. 7, doesn't matter. Data paths for the microcode commands (same 96 and store 98) and reset signal 100 are also shown.

In FIG. 7, a value dyprode 118 ("Dyprode4") is driven by a clock 120 and 1-bit microcode 122. Dyprode4 118 features two N-bit multiplexers 128 and one N-bit register same_value 130. This dyprode 118 produces N bits of output 134 at each cycle.

The microcode commands 122 are summarized in Table 9 below.

TABLE 9

| Microcode Mnemonic | Microcode Binary Value |
|---|---|
| store | 0 |
| same | 1 |

Unless the microcode command is "store," the N-bit in value 132 for Dyprode4 shown in FIG. 8 doesn't matter. Data paths for the microcode commands (same 124 and store 126) are also shown.

With reference to FIG. 9, the invention's approach to compressing and decompressing program words using dyprodes is summarized. First, a time-sequential sequence of microcodes is compacted into horizontal microcodes, or program words (block 146). Next, the horizontal microcode is compressed into a 1- or 2-bit sequence of microcodes (block 148). This compressed sequence of microcodes is then stored in program memory (block 150). This bit sequence and any required values are then fed to appropriate dyprodes to decompress program word fields and reassemble the uncompressed program word (block 152). The reassembled program word is then delivered to the processor for execution (block 154).

What is claimed is:

1. A device for decompressing a data stream to produce at least one field of an uncompressed program word to be delivered to a processor for execution, said device comprising:
   a) at least one register for storing a value of N bits;
   b) a first means for receiving a first input, said first input being another value of N bits;
   c) a second means for receiving a second input, said second input a microcode representing an instruction on how to process the N-bit values, the microcode describing a trajectory in a space of operations and operands to be executed at each cycle in terms including one of the following:
      i) a starting point or delta; or
      ii) one of a limited set of values frequently appearing in a program section;
   said N-bit values from a group consisting of:
      i) at least one N-bit value from at least one register;
      ii) at least one N-bit value from at least one register and the N-bit value from the first input; and
   d) at least one processing means for processing values of N bits from the group consisting of:
      i) at least one N-bit value from at least one register;
      ii) at least one N-bit value from at least one register and the N-bit value from the first input; and
   e) an output multiplexer for producing an output of N bits, wherein said output is at least one field of a decompressed program word to be delivered to the processor for execution, wherein said processor is in electrical communication with the device.

2. The device of claim 1 further including a third means for receiving a third input, said third input a reset signal.

3. The device of claim 1 further including a fourth means for receiving a fourth input, said fourth input a clock signal.

4. The device of claim 1 wherein the processing means includes at least one adder.

5. The device of claim 1 wherein the processing means includes at least one multiplexer.

6. The device of claim 5 wherein the processing means includes at least one input multiplexer.

7. The device of claim 1 wherein there is one register.

8. The device of claim 1 wherein there are three registers.

9. The device of claim 1 wherein there are five registers.

10. The device of claim 1 wherein the microcode is 1 bit.

11. The device of claim 1 wherein the microcode is 2 bits.

12. The device of claim 1 wherein the at least one register for storing a value of N bits stores a slope value of N bits.

13. The device of claim 1 wherein the at least one register for storing a value of N bits stores a starting value of N bits.

14. The device of claim 1 wherein the first input is a slope value of N bits.

15. The device of claim 1 wherein the first input is a store op code of N bits.

16. The device of claim 1 wherein the first input is a numerical value of N bits.

17. The device of claim 1 wherein the output is a store op code.

18. The device of claim 1 wherein the output is a numerical value.

19. The device of claim 1 wherein the output is a register file address.

20. The device of claim 1 wherein the device is located on a microprocessor chip.

21. The device of claim 1 further including means for freezing a read address to a value assigned during the last useful operation.

22. The device of claim 1 further including means for producing a write disable signal during a default cycle.

23. A device for decompressing a data stream to produce at least one field of an uncompressed program word to be delivered to a processor for execution, said device comprising:
   a) at least one register for storing a first value of N bits;
   b) a first means for receiving a first input, said first input being a second value of N bits;
   c) a second means for receiving a second input, said second input a microcode representing an instruction on how to process the first and second values of N bits, the microcode describing a trajectory in a space of operations and operands to be executed at each cycle in terms including one of the following:
  i) a starting point or delta; or
  ii) one of a limited set of values frequently appearing in a program section; and
d) a plurality of multiplexers for multiplexing the first and second values of N bits, one of the plurality of multiplexers producing an output of N bits, wherein said output is at least one field of a decompressed program word to be delivered to the processor for execution, wherein said processor is in electrical communication with the device.

24. The device of claim 23 further including a plurality of registers for storing a plurality of values of N bits.

25. The device of claim 23 wherein the plurality of multiplexers have means for multiplexing values of N bits, said N bits chosen from a group consisting of: p1 a) the plurality of N bits stored in the plurality of registers; and
  b) at least one N-bit value from at least one register and the first input of N bits.

26. The device of claim 23 further including a third means for receiving a third input, said third input a reset signal[s].

27. The device of claim 23 further including a fourth means for receiving a fourth input, said fourth input a clock signal.

28. The device of claim 24 wherein there are three registers.

29. The device of claim 24 wherein there are five registers.

30. The device of claim 23 wherein the microcode is 1 bit.

31. The device of claim 23 wherein the microcode is 2 bits.

32. The device of claim 23 further including a third means for receiving a third input, said third input a reset signal.

33. The device of claim 23 further including a fourth means for receiving a fourth input, said fourth input a clock signal.

34. The device of claim 23 wherein the at least one register for storing a value of N bits stores a slope value of N bits.

35. The device of claim 23 wherein the at least one register for storing a value of N bits stores a starting value of N bits.

36. The device of claim 23 wherein the first input is a slope value of N bits.

37. The device of claim 23 wherein the first input is a store op code of N bits.

38. The device of claim 23 wherein the first input is a numerical value of N bits.

39. The device of claim 23 wherein the output is a store op code.

40. The device of claim 23 wherein the output is a numerical value.

41. The device of claim 23 wherein the output is a register file address.

42. The device of claim 23 wherein the device is located on a microprocessor chip.

43. The device of claim 23 further including means for freezing a read address to a value assigned during the last useful operation.

44. The device of claim 23 further including means for producing a write disable signal during a default cycle.

45. A method for decompressing a data stream to produce at least one field of an uncompressed program word to be delivered to a processor for execution, said method comprising:
  a) storing a first value of N bits in a register in a device in electrical communication with a processor;
  b) receiving an input of a second value of N bits at the device;
  c) receiving at the device a microcode representing an instruction on how to process the first and second values of N bits, the microcode describing a trajectory in a space of operations and operands to be executed at each cycle in terms including one of the following:
    i) a starting point or delta; or
    ii) one of a limited set of values frequently appearing in a program section;
  d) processing at the device the first and second values of N bits; and
  e) producing at the device an output of N bits, wherein said output is at least one field of a decompressed program word to be delivered to the processor for execution.

46. The method of claim 45 further comprising receiving a reset signal.

47. The method of claim 45 further comprising receiving a clock signal.

48. The method of claim 45 wherein the microcode is 1 bit.

49. The method of claim 45 wherein the microcode is 2 bits.

50. The method of claim 45 wherein the second value of N bits is a slope value.

51. The method of claim 45 wherein the second value of N bits is a store op code.

52. The method of claim 45 wherein the second value of N bits is a numerical value.

53. The method of claim 45 wherein processing includes adding values of N bits.

54. The method of claim 45 wherein processing includes multiplexing values of N bits.

55. The method of claim 45 wherein the output is a store op code.

56. The method of claim 45 wherein the output is a numerical value.

57. The method of claim 45 wherein the output is a register file address.

58. The method of claim 47 wherein the producing step includes multiplexing at least one value of N bits to produce output.

59. The method of claim 45 further including freezing a read address to a value assigned during the last useful operation.

60. The method of claim 45 further including producing a write disable signal during a default cycle.

61. The device of claim 23 further including at least one processing means for processing values of N bits from the group consisting of:
  a) at least one N-bit value from at least one register;
  b) at least one N-bit value from at least one register and the N-bit value from the first input.

62. The device of claim 61 wherein at least one of the processing means is an adder.

* * * * *